Nov. 21, 1967 H. M. HOBOLTH 3,353,558
CONVENIENCE VALVE
Filed Nov. 16, 1964

INVENTOR
HAYES M. HOBOLTH

BY *Miller, Morriss, & Pappas*
ATTORNEYS

United States Patent Office 3,353,558
Patented Nov. 21, 1967

3,353,558
CONVENIENCE VALVE
Hayes M. Hobolth, 1750 Oak Grove Road,
Howell, Mich. 48843
Filed Nov. 16, 1964, Ser. No. 411,443
4 Claims. (Cl. 137—625.48)

The present invention relates to a new and improved valve structure and flow divider device particularly useful for garden hose connections. More particularly the device of the present invention is a convenience valve attachable to an outdoor faucet and providing an extension of the faucet and a depending selectively operable nozzle incorporating unique valving so that water can be drawn from the faucet without disconnect of a garden hose. The valve structure of the present invention is self closing by water pressure upon release of manual pressure.

The device is accordingly connectable to the hose at one branch and is also connectable to the outdoor faucet or hose bib.

The prior art, as known to applicant, shows a variety of valve devices, primarily drinking fountain attachments which are connectable to faucets. The prior art discloses the following work considered to be inventively distinguished by the present structure: U.S. Letters Patent 1,875,283 to Trupiano, 2,975,983 to Niebling, 2,710,984 to Grueter, and 2,222,273 to Worthington.

The primary object of the present invention is to provide a convenience outlet in the form of a branched flow divider fitting wherein a depending branch is supplied with an axially moving manually operable pressure closing valve. The structure thus allows for the withdrawal of water without disconnect of a garden hose and once adequate water is withdrawn the valve automatically closes as manual operating pressure is released.

Another object is to provide a simple valve sensitive to manual push operation without springs, and which valve is easily integrated in a casting or housing.

Other objects including stark simplicity, self packing, and simple installation will be appreciated as the description proceeds.

*General description*

Figure 1:
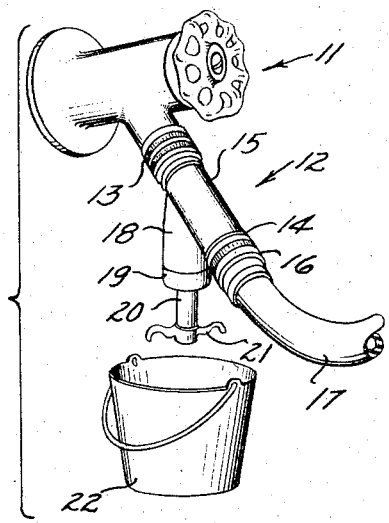
FIGURE 1 is a perspective view of the convenience valve of the present invention secured in position intermediate hose bib connection and garden hose and showing the depending branch ready to deliver flow to a bucket directly beneath the depending branch.

In general a base casting is provided which is generally Y-shaped thereby providing two separate flow branches, the flow branches defining internally connected cavities. The major flow branch is provided at one end with a threaded female connector and at the other end a set of male threads is provided to accommodate connection of a hose. The minor branch preferably depends in a substantially vertical manner and is fitted with an axially moveable tubular valve stem which is normally closed by the pressure of water acting on a block in the stem.

The valve stem itself is provided with a handle so that the stem can be axially moved upward (in relation to the drawing) by hand thereby allowing flow through the minor branch, through the valve and stem and into any receptacle without the necessity for disconnecting the hose. It will also be seen that diversion of flow from the main branch is substantially complete when the tubular valve stem is fully open at the upper end of its axial travel. Upon release of manual pressure the valve stem returns to its normally closed position accomplishing seating of the valve, and the valve is self-packing against the leakage around the stem. A person or homeowner finds the structure of the present invention very useful and time saving where it is necessary or desirable to draw water from an outdoor tap without removal of the hose connection. The valve is smooth operating and conversion to diverted flow is at or close to normal water line pressure.

*Specific description*

Referring to the drawing and with particularity to the FIGURE 1, thereof, a hose bib or outdoor faucet 11 is shown of a well known type and to which a garden hose is normally connectable. A convenience valve unit 12 in accord with the present invention is threadably connected to the faucet 11 as by means of the female threaded connector 13. Male threaded fitting 14 is provided at the opposite end of main branch 15 which is threadably connectable to hose coupling 16 to provide a flow connection through the convenience valve unit 12, from the faucet 11, and through the hose 17. A minor branch 18, integral with the main branch 15 of the valve unit 12, preferably depends from the main branch 15. This establishes a diversionary flow direction through the convenience valve unit 12 for delivery through the minor branch 18. A combination packing plug and bearing 19 will be seen as providing an annular journal for the valve stem 20 which is axially positioned in the minor branch 18. A flared handle 21 extends radially from the stem 20 so that the stem may be manually moved axially and upward. As the stem 20 is so displaced by manual movement the flow of liquid or water through the main branch 15 is diverted to flow through the stem 20 and into a receptacle 22 at the convenience of the valve operator. Release of the stem 20 results in a return of the valve stem 20 to the shut off position shown.

Figure 2:
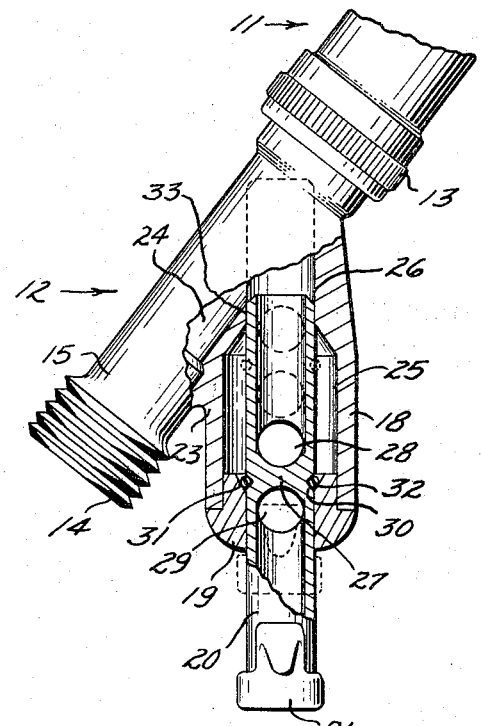
FIGURE 2 is a partially cut-away side elevation view of the convenience fitting shown in FIGURE 1 and showing the valve structure exposed. The flow position of the valve stem is shown in phantom line.

By reference to the FIGURE 2 the uniqueness of the convenience valve unit 12 is better revealed insofar as the internal construction is concerned. The valve unit 12 comprises a Y body 23 comprising main branch 15 and integral minor branch 18. The branches 15 and 18 are thus connected and define connecting cavities 24 and 25, respectively, through the unit 12. The passage or cavity 25 in the minor branch 18 is on an axis intersecting the axis of the passage or cavity 24 in the branch 15. The passage 25 is constricted to form an annular internal shoulder 26 adjacent merger of the cavities 24 and 25. As will be seen the annular shoulder 26 provides a guide journal stabilizing the valve stem 20, and may be keyed thereto where it is desired to avoid rotation of the stem 20 on its axis.

The valve stem 20 comprises a tubular sleeve blocked midway of the ends thereof by transverse wall 27. This divides the tubular stem 20 into upper and lower cylindrical chambers on the common axis of the stem 20 and open at each end. Two spaced apart parallel transverse openings or passages 28 and 29 are provided fully through the tubular walls of the valve stem 20, one above the transverse wall 27 and one below the transverse wall 27.

An annular outer peripheral groove 30 is provided in the exterior of the stem 20 externally adjacent the transverse wall 27. A resilient seal such as O-ring 31 of rubber, neoprene, Teflon or the like is snugly fitted into the groove 30.

The packing bushing or journal 19 provides a coaxial collar in running fit relationship with the stem 20, the chamfer 32 on the inner edge thereof providing an interference stop relationship with the O-ring 31. Thus the ring element 31 serves as a seal and stem packing and stop means limiting the downward or outward travel of the stem 20. The bushing 19 is then axially secured in the opening 25 of the minor branch 18 and the inner end 33 (by reference to the drawing at FIGURE 2) of the stem 20 is in running journal guide relationship with the internal shoulder 26. The handle 21 is secured to the lower depending end of the stem 20 and radially extends therefrom.

Figure 3:
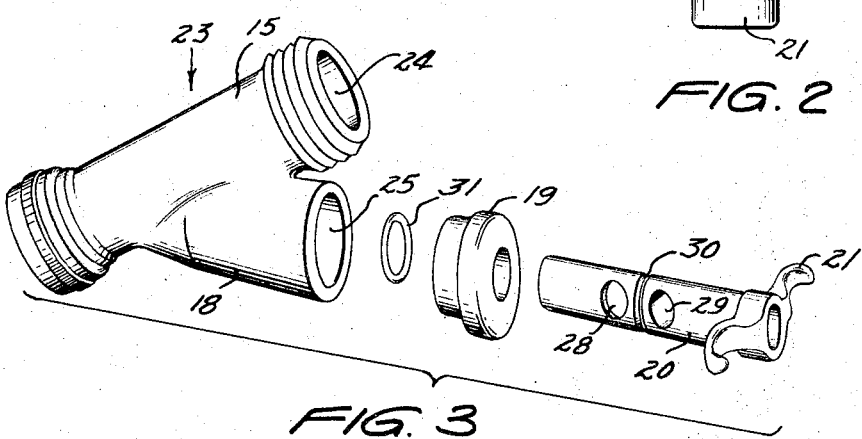
FIGURE 3 is an exploded perspective view of the base casting and internal elements of the structure of the present invention and indicating the simplicity of valve parts and ease of assembly.

By reference to the FIGURE 3 the assembly of the convenience valve is appreciated. The stem 20 is inserted through the bushing 19 and the O-ring 31 is then slipped over the stem 20 and into place in the groove 30. Then the assembly, of stem 20, O-ring 31 and bushing 19 is inserted into the passage 25 in the minor branch 18 of the branched base element 23. The bushing 19 is press fitted; cemented, threaded, or otherwise secured to the base element 23 at the end of the depending minor branch 18. As so assembled, by reference to FIGURE 2, the O-ring 31 shoulders on the chamfer 32 preventing leakage around the stem 20, and the collar 19, with the shoulder 26 in the upper end of the base element 23, also assures alignment support of the stem 20 while allowing smooth axial movement when the handle 21 is pressed upwardly. The chamfer 32 is selected as to angle so as to exert a peripheral inner directed force on the ring 31 so as to avoid any tendency of stripping the ring 31 from its groove 30. The maximum upward excursion of the stem 20 is shown in phantom line in the FIGURE 2.

When a liquid such as water is flowing under pressure through the convenience valve 12 to a hose, the pressure of the flowing water maintains the valve stem 20 in closed relation as seen in FIGURE 2 with the O-ring 31 sealing communication between passage 25 and lower opening 29 and forming an effective packing about the stem 20. The pressure of the water is effective to close the valve because the pressure of the water acts against the lower external pressure until the water pressure is manually overcome so that water can be diverted through the upper end of the stem 20, through the opening 28, into the cavity 25 and thence through opening 29 and through and out the lower handle end of valve stem 21.

The valve and hose fitting described is most useful and convenient for homeowners and when properly used saves considerable time previously consumed in connecting and disconnecting garden hose.

While the device may be made of metal, some or all of its parts are specifically adapted to be prepared from plastic or resin material. The materials selected should be considered for durability and corrosion resistance and in the preferred form described is particularly adapted for plastic fabrication.

Having thus described an operative embodiment of my invention others skilled in the art will appreciate changes, modifications and improvements, and such changes, modifications and improvements are intended to be included herein limited only by the scope of the hereinafter appended claims.

I claim:

1. A convenience valve for hose connections and the like comprising:
   (a) a Y-shaped base casting providing converging main and minor branches and defining two converging openings or cavities therethrough;
   (b) a manually operable valve element axially and guidably moveable in one of the said cavities provided in the minor of said branches and having two separate tubular axial openings therethrough with spaced apart transverse passages, one to each of said tubular openings, said valve element progressively blocking the major of said branches upon opening; and
   (c) an annular seal and stop element secured to said valve element for axial movement therewith and in interference relation against said base casting in one direction of movement of said valve element.

2. A convenience valve and faucet extension comprising:
   (a) a substantially Y-shaped base element defining two intersecting internal cavities open through said base element;
   (b) a male hose connector thread at the end of one of the legs of said base element;
   (c) a female threaded hose connector secured to the other end of one of the legs of said base element;
   (d) a manually operable tubular valve element journalled for axial movement in the other of the legs of said base element and having passages therethrough for flow at selected axial positioning of said valve element progressively blocking said first mentioned leg; and
   (e) a combination annular packing seal and stop restricting outward movement of said valve element.

3. A convenience valve structure provided for securing to outdoor faucets and garden hose and the like so as to permit the drawing of water without disconnect of the hose comprising:
   (a) a Y branch casting; one branch of which is a main branch defining a flow cavity axially through said casting, and the minor branch thereof defining a communicating cavity intersecting the cavity in said main branch;
   (b) a male threaded hose connection at one end of said main branch;
   (c) a female threaded hose connection at the other end of said main branch;
   (d) a tubular valve element axially moveable in the cavity of said minor branch and guidably journalled by said casting, said valve element being axially blocked by a transverse wall midway of the length of said tubular element and said tubular valve element defining a pair of spaced apart communication passages through the tubular valve element, one of said passages on each side of said transverse wall, said valve element progressively blocking the major of said branches upon opening;
   (e) an annular seal and stop element secured in a position of register around said valve element at the location of said transverse blocking wall and said seal being moveable with said valve element; and
   (f) an annular journal and plug closing about the periphery of said valve element and providing a seal seat against which said annular seal is engaged in the closed position of said valve element and providing a closure of said minor branch around said valve element and peripherally closing against said casting.

4. A self-closing valve structure for convenience service comprising:
   (a) an axially moveable open ended tubular valve stem having a pair of spaced apart passages through the walls thereof;
   (b) a wall transversely across the axis of said tubular valve stem midway of the ends of said stem and between said passages and dividing said stem into an upper and lower cylindrical chamber;
   (c) an annular seal element around said stem in peripheral register with said transverse wall;
   (d) an annular bushing in axial journal relation to said stem and defining an inner chamfer seat against which said seal element butts at one extreme of valve stem travel; and (e) a Y-shaped tubular conduit, said axially movable stem in one of the branches of said conduit in normally closed relation and, upon axial movement of said stem, blocking flow through the other of said branches of said Y-shaped conduit while opening to flow in the last mentioned of said branches.

References Cited

UNITED STATES PATENTS

| | | | |
|---|---|---|---|
| 2,333,767 | 11/1943 | Davis | 239—449 |
| 2,505,410 | 4/1950 | Klaas | 251—344 X |
| 2,588,255 | 3/1952 | Larsh | 137—608 X |
| 2,591,514 | 8/1952 | Courtot | 251—353 X |
| 2,760,754 | 8/1956 | Gladstone | 251—344 |
| 2,762,387 | 9/1956 | Orwin | 137—608 |
| 3,064,678 | 11/1962 | Shames et al. | 137—562 |
| 3,108,721 | 10/1963 | Nebinger | 251—353 X |
| 3,181,555 | 5/1965 | Jacobson | 251—353 X |

M. CARY NELSON, *Primary Examiner.*

S. SCOTT, *Assistant Examiner.*